July 23, 1929.  W. V. SPROLES  1,721,645
FAN ATTACHMENT FOR TRACTORS
Filed Aug. 29, 1927
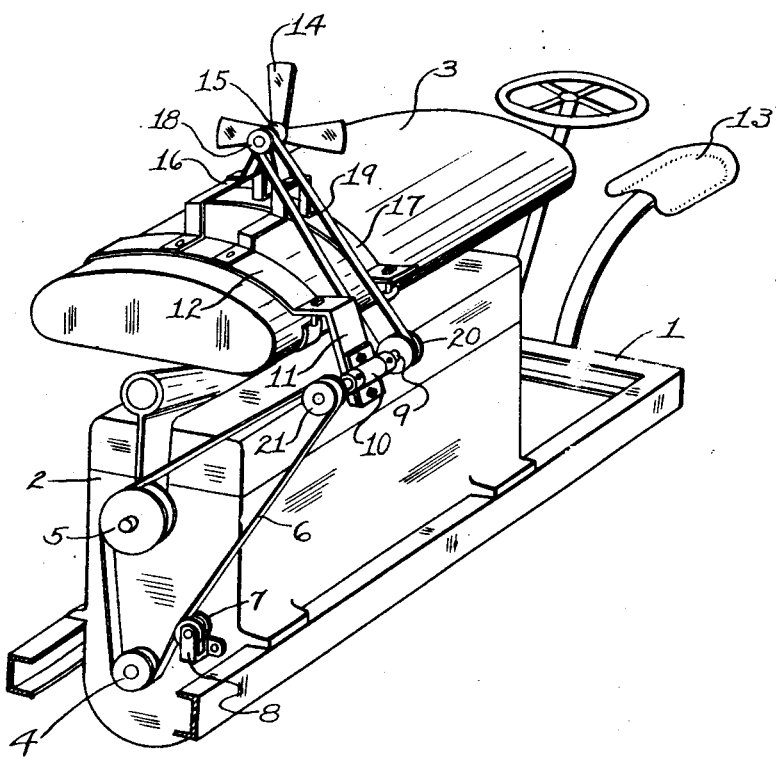

Patented July 23, 1929.

1,721,645

UNITED STATES PATENT OFFICE.

WILLIAM VENABLE SPROLES, OF LA FERIA, TEXAS.

FAN ATTACHMENT FOR TRACTORS.

Application filed August 29, 1927. Serial No. 216,108.

This invention relates to a fan attachment for tractors, and has for one object to provide a means for reducing the discomfort of the operator thereof.

In operating a tractor, especially a tractor of the Fordson type, the heat and dust created by the operation of the same becomes unbearable to the operator thereof. For this reason it is difficult to procure a competent operator of such a tractor for agricultural work, and it is the purpose of my invention to avoid the difficulty of heat and dust by mounting a fan upon said tractor in such manner as to keep the operator thereof cool and also to allay the dust and prevent the lodgement thereof on the said operator.

A further object is to provide such a means readily attached to any type of tractor, that will be simple to construct and inexpensive to install, and that may be permanently mounted on said tractor without interfering with the operation thereof.

With the above and other objects in view, my invention consists in the combination and arrangement of parts hereinafter described and claimed, and more particularly illustrated in the accompanying drawing, wherein is shown a perspective view of a tractor, parts thereof being broken away, and having my invention shown in connection therewith.

Referring now more particularly to the drawings, I show a well known type of tractor embodying a frame 1 having an engine 2 mounted thereon. In the tractor illustrated a fuel tank 3 extends over the engine 2 and forms a part of the frame 1. The engine 2 has an engine pulley 4 operatively connected therewith, said pulley being aligned with and adapted to be belted to a radiator fan pulley 5 in the usual manner, but in my invention I remove the belt usually supplied for this purpose and substitute a belt 6, as will be hereinafter described. I also provide an idler pulley 7 aligned with the engine pulley 4 and journaled in an arm 8 adjustably secured to the engine 2.

Axially parallel with and positioned above and to one side of said engine 2 is a countershaft 9 journaled in a bearing 10 mounted on an extension 11 of a saddle 12 secured to the tank 3.

Adjacent to and disposed in alignment with the operator's seat 13 so as to create a current of air in the direction thereof is a circulating fan 14 journaled in a bearing 15 adjustably secured to a bracket 16 mounted on a saddle 17 secured to the tank 3.

The circulating fan 14 has a pulley 18 operatively mounted thereon, which is belted, as by a belt 19, to a pulley 20 mounted on one end of the countershaft 9 and in alignment with said pulley 18; the other end of said countershaft has a pulley 21 mounted thereon in alignment with the engine pulley 4 and operatively connected thereto as by said belt 6, which passes around the pulleys 4 and 21, one run of the belt passing over the idler pulley 7, and the other run passing over the radiator fan pulley 5.

In use, the operation of the engine will drive the radiator fan and also the countershaft 9, which countershaft in turn will drive the circulating fan 14. Thus it will be seen that as long as the engine is operating a current of air will be directed towards the operator's seat, whereby the said operator may be kept cool and free from dust. By suitably adjusting the idler pulley 7 the belt 6 may be kept taut; and by suitably adjusting the bearing 15 on the bracket 16 the belt 19 may also be kept taut.

I do not wish to be limited in the application of my invention to the specific type of tractor shown, and it will be readily seen that I may mount the countershaft 9 axially parallel with and above and to one side of any type of motivating agency as commonly used in power operated tractors in any convenient manner; and I may also mount the circulating fan 14 adjacent to and disposed in alignment with the operator's seat of a tractor in any manner suitable to the arrangement of the tractor to which the device may be applied, and so as to create a current of air in the direction of said operator's seat.

It will also be seen that my invention is very simple to construct, and may be readily installed on any make of tractor without interfering with the usual operation thereof; the device is sturdy, will consume very little power, and when attached to the tractor becomes a permanent part thereof.

While I have herein described a certain specific method of constructing and assembling the elements of my invention, it is understood same may be varied in minor details, not departing from the spirit of my invention as defined in the appended claim.

I claim:

In a power operated tractor having an internal combustion engine, an engine pulley mounted on the crankshaft of said engine, a radiator fan pulley rotatably mounted in alignment with said engine pulley and an operator's seat mounted on said tractor, the combination comprising an idler pulley rotatably mounted in alignment with said engine pulley, a countershaft rotatably mounted above and to one side of said engine and axially parallel thereto, a circulating fan mounted on said tractor above said engine, said fan being adjacent to said operator's seat and in alignment therewith so as to create a current of air in the direction thereof, a countershaft pulley mounted on said countershaft in alignment with said engine pulley, operative means passing over said engine pulley and said countershaft pulley, one run thereof passing over said idler pulley and the other run passing over said radiator fan pulley, and operative means connecting said circulating fan with said countershaft.

In testimony whereof I affix my signature.

WILLIAM VENABLE SPROLES.